Nov. 12, 1968  R. F. SPARGO  3,410,356
EXTENSION FRAME FOR SUPPORTING A TRACTOR MOUNTED HARVESTER
Filed July 5, 1966  2 Sheets-Sheet 1

Inventor
RONALD F. SPARGO
BY
Tweedale & Gerhardt
Attorneys

Nov. 12, 1968   R. F. SPARGO   3,410,356
EXTENSION FRAME FOR SUPPORTING A TRACTOR MOUNTED HARVESTER
Filed July 5, 1966   2 Sheets-Sheet 2

Inventor
RONALD F. SPARGO
BY
Tweedale & Gerhardt
Attorneys

United States Patent Office 3,410,356
Patented Nov. 12, 1968

3,410,356
EXTENSION FRAME FOR SUPPORTING A TRACTOR MOUNTED HARVESTER
Ronald F. Spargo, Victoria, Australia, assignor to Massey-Ferguson (Australia) Limited, Victoria, Australia
Filed July 5, 1966, Ser. No. 562,569
Claims priority, application Great Britain, July 10, 1965, 29,352/65
3 Claims. (Cl. 180—1)

ABSTRACT OF THE DISCLOSURE

An agriculture machine mounted on one side of a tractor having an extended rear axle supported by a drive wheel on the outside of the machine. A framework on the tractor supports the machine. The machine may be a harvester having a double conveyor arrangement that can discharge harvested crops in a variety of directions on the opposite side of the tractor from the machine.

---

This invention relates to agricultural harvesting machines. Row crop harvesters have been previously mounted on tractors. Cane harvesters are generally larger and heavier than other harvesting machines such as corn pickers and hay foragers and consequently the usual method of mounting the harvester on the tractor has limitations. Such machines discharge their harvested material to either trailers pulled by the tractor, or trailer or trucks moving alongside of the harvester. It is therefore desirable to provide an easily operated apparatus for discharging the harvested material in at least several different points.

It is, therefore, an object of the present invention to provide a harvesting machine with means whereby the crop may be discharged to the rear or to one side of the machine.

It is a further object to provide a rigid frame structure adapted to support an agricultural machine at one side of a tractor.

According to the invention there is provided a harvesting machine having crop discharge means including a first conveyor mounted on the machine and extending upwardly and transversely relative to the direction of travel of the machine and a second conveyor rotatably mounted below the upper end of said first conveyor to receive crop therefrom, and rotatable relative to said first conveyor into a plurality of discharge positions.

Preferably said first conveyor is angled rearwardly relative to the cross-wise direction of the machine so that the upper end thereof is located further rearwardly than the lower end.

Preferably also the machine is adapted to be mounted at one side of and propelled by a tractor, said first conveyor extending across the rear of the tractor and the discharge positions of said second conveyor including one in which the conveyor discharges crop directly behind the tractor and one in which the conveyor discharges crop to the side of the tractor opposite to that at which the machine is mounted.

Further according to the invention there is provided a framework for use in coupling an agricultural machine in a position offset to one side of a tractor, and inwardly of an extended wheel of the tractor, the framework comprising substantially parallel support members adapted to extend one on either side of and to be rigidly connected to the tractor, a laterally extending beam carried by said support members and adapted to project beyond one side of the tractor, and a further support member secured to said beam adapted for connection to said machine, and adapted to serve as a support for a bearing for the axle of said laterally extended wheel of the tractor.

In order that the invention may be more clearly understood an embodiment will now be described, by way of example only, with reference to the accompanying drawings, in which.

Figure 1:
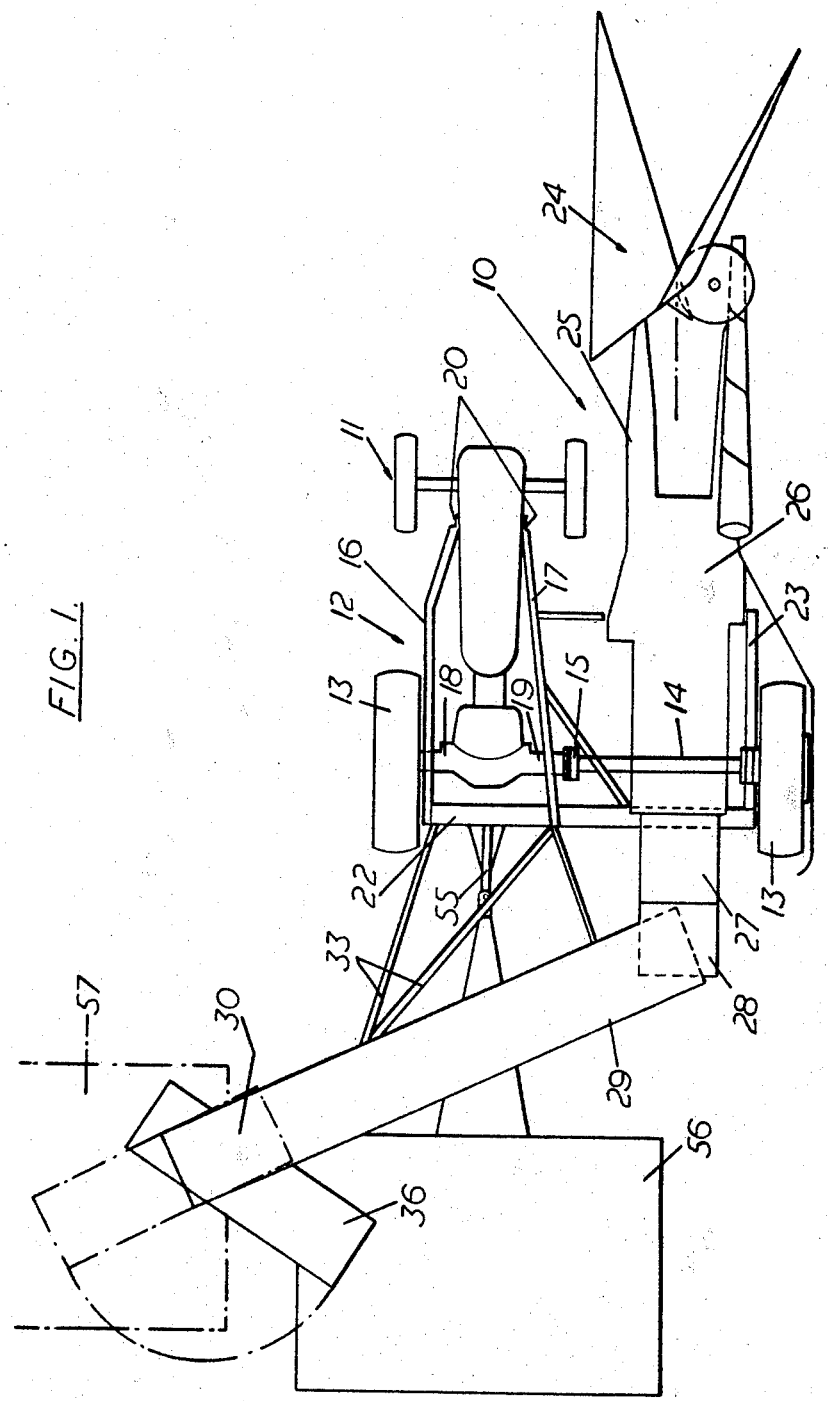
FIG. 1 is a diagrammatic plan view of a harvesting machine according to the invention coupled to a tractor.

Referring to the drawings, the harvesting machine shown is a cane harvester, generally indicated 10, and is attached to the right hand side of a tractor 11 by means of a rigid frame, generally indicated 12. One of the tractor rear wheels 13 is offset to one side of its usual position, is supported by the frame 12, and is driven through an extension shaft 14 drivingly connected at 15 to the stub shaft which normally supports and drives the wheel 13.

The frame 12 comprises two longitudinal members 16, 17, which extend one on each side of the tractor and are attached to the tractor rear axle casings 18, 19. These longitudinal members 16, 17 are supported by front mounting parts 20. A transverse frame portion 22 is supported by the members 16, 17, extends transversely behind the tractor rear axle, and supports a third longitudinal member 23 which supports the offset tractor wheel 13 and is connected to the harvester.

The cane harvester is mounted on the frame 12 inwardly of the offset wheel 13, and includes a top cutter unit 24 for removing the tops of the cane, a gathering unit 25 for collecting the cane and presenting it to a butt cutting and billet cutting unit 26, and an elevator 27 to collect the chopped cane and elevate it rearwardly. The elevator 27 is mounted on a supporting platform extending rearwardly from the transverse frame portion 22.

The chopped cane is delivered by the elevator 27 into a transfer hopper 28 and a first conveyor 29, situated to receive cane from the hopper 28, has its axis inclined upwardly and transversely relative to the fore and aft direction of travel of the harvester so that the discharge end 30 is situated to the rear of the tractor on the side remote from the harvester unit. It is convenient for the elevator to make an angle $\alpha$ to the crosswise direction so that the discharge end is located further rearwardly than the receiving end. In addition to being supported at its lower end by the hopper 28, the conveyor is also supported by a framework 33 extending from the rigid frame 12 to a point near to the discharge end of the conveyor.

The conveyor 29 may be of conventional chain and slat type driven by suitable gearing from the harvester drive. A grid-type floor may also be incorporated in the lower section of the conveyor to assist in trash disposal.

Figure 2:
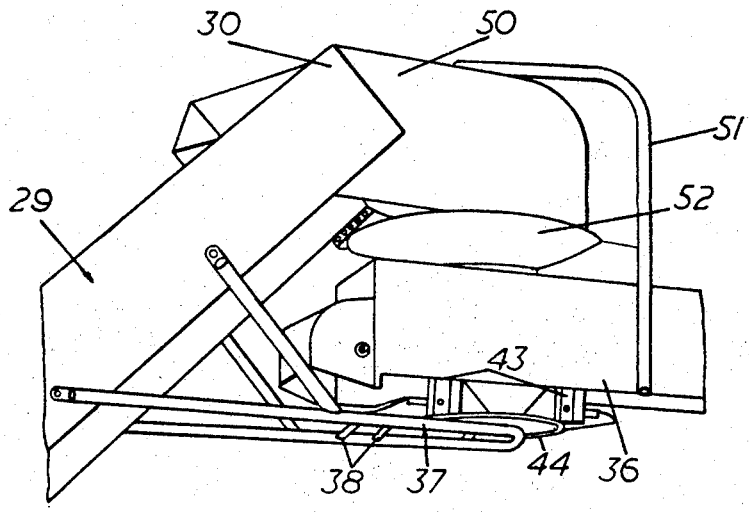
FIG. 2 is a perspective view of a part of the discharge conveying means of the machine of FIG. 1.
Figure 3:
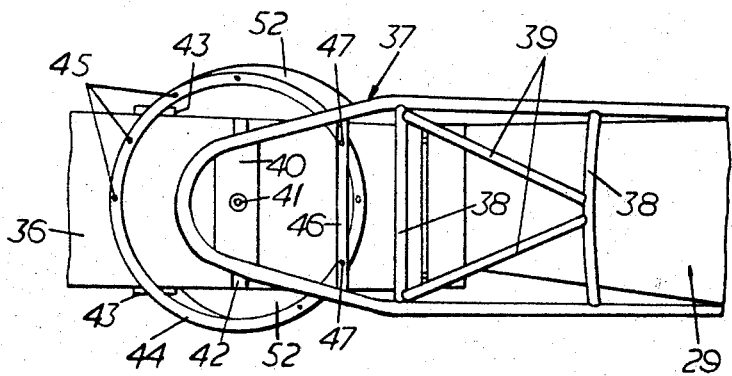
FIG. 3 is a plan view from underneath the discharge conveying means of FIG. 2.

A second conveyor 36 is swivel-mounted at the discharge end of the first conveyor. The connection between the first and second conveyors is shown in FIGS. 2 and 3. The first conveyor 29 has rigidly attached thereto a framework including a horizontal U-shaped tubular member 37 braced by cross members 38 and stiffening tubes 39. At the curved end of the U-shaped member 37 there is welded thereto a plate 40 which carries a vertical pivot shaft 41. This shaft 41 is connected to a cross member 42 which is attached to the delivery end of the conveyor 36 so that the conveyor 36 can swivel about the axis of shaft 41. At the delivery end, the conveyor 36 has depending legs 43 to which are attached a ring 44 having a plurality of equi-pitched holes 45. These holes can register with holes 47 in a cross bar 46 on the U-shaped member 37 so that the conveyor 36 may be rotated into and fixed in a selected angular position by means of suitable locking elements passing through cooperating holes 45, 47.

The first conveyor 29 includes, at its upper end, a discharge shield 50, which in addition to guiding the crop discharged from the conveyor acts as the locating member for a second pivot shaft, not shown, carried on a framework 51 attached to the second conveyor 36. As best seen in FIG. 2, the delivery end of the conveyor 36 fits between the shield 50 and the U-shaped member 37.

The second conveyor 36 is provided with a conical crop guide plate 52 mounted under the discharge shield 50. Thus, the second conveyor may be pivoted about the shaft 41 and the second pivot shaft to any suitable position, and the crop passing from the first conveyor will be guided on to the second conveyor by the discharge shield 50 and crop guide plate 52.

The conveyor 36 may be of the chain and slat type and may be driven by any suitable means such as a hydraulic motor supplied with oil from a suitable source such, for example, as the tractor hydraulic system or by a hydraulic power pack driven by the tractor or harvester engine.

The cross member 22 of the rigid frame 12 carries a hitch 55 to which a trailer 56 may be attached, so that it is towed behind the tractor and harvester combination. In this instance, the second conveyor 36 is positioned as shown in full lines in FIG. 1 to discharge to the trailer positioned behind the harvester.

Under some circumstances, however, and particularly in those conditions where traction is difficult, it is desirable to tow the trailer by a second tractor running alongside the first tractor and the harvester. In this instance the trailer is diagrammatically illustrated in FIG. 1, at 57 and to discharge to it the conveyor 36 is adjusted to the position shown in dot-dash outline; in this case the crop is delivered transversely beyond the harvester.

It has been found in practice that a convenient disposition for the first and second conveyors is for the first conveyor 29 to be inclined upwardly at an angle of approximately 45° and for the angle α to be between 20° and 30°. The second conveyor is pivotal through an angle of 120°, anti-clockwise as viewed in FIG. 1, from a position where it is aligned with the first conveyor, to the second position for discharge to a trailer towed behind the tractor.

Although the above described example is a cane harvester, it will be understood that the invention may be applied to other types of harvesting machines. Moreover, the invention may be applied to a self-propelled harvesting machine instead of one adapted to be drawn by a tractor.

The conveyor 36 may be adjustable by means of a hydraulic jack under the control of the tractor driver.

What is claimed is:

1. A framework for mounting an agricultural machine in a position offset to one side of a tractor having a rear axle housing and inwardly of an extended rear axle driver wheel of the tractor, the framework comprising substantially parallel support members adapted to extend one on either side of and to be rigidly connected to the tractor, a laterally extending beam carried by said support members and adapted to project beyond one side of the tractor, and a further support member secured to said beam adapted for connection to said machine, and adapted to serve as a support for a bearing for the axle of said laterally extended wheel of the tractor.

2. A framework according to claim 1 in which said further support member is disposed substantially parallel to said first mentioned support members.

3. A framework according to claim 2 in which said first mentioned support members are arranged to be supported, at the ends adjacent said beam, one on each side of the rear axle housing of the tractor.

References Cited

UNITED STATES PATENTS

| | | | |
|---|---|---|---|
| 2,575,620 | 11/1951 | Fergason | 56—18 |
| 2,648,422 | 8/1953 | Kling | 198—100 XR |
| 2,814,351 | 11/1957 | Richey et al. | 180—1 |
| 2,953,886 | 9/1960 | Douglas et al. | 56—17 |
| 2,957,293 | 10/1960 | Roscoe et al. | 56—18 |
| 3,021,025 | 2/1962 | Sudenga et al. | 198—100 XR |
| 3,151,732 | 10/1964 | Oury et al. | 198—92 |

FOREIGN PATENTS 167,042    3/1921    Great Britain.

LEO FRIAGLIA, *Primary Examiner.*

MILTON L. SMITH, *Assistant Examiner.*